(12) United States Patent
Mikami

(10) Patent No.: US 11,177,885 B2
(45) Date of Patent: Nov. 16, 2021

(54) REPEATER AND REPEATING METHOD

(71) Applicant: NEC Corporation, Tokyo (JP)

(72) Inventor: Satoshi Mikami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 16/494,808

(22) PCT Filed: Apr. 5, 2018

(86) PCT No.: PCT/JP2018/014566
§ 371 (c)(1),
(2) Date: Sep. 17, 2019

(87) PCT Pub. No.: WO2018/190240
PCT Pub. Date: Oct. 18, 2018

(65) Prior Publication Data
US 2020/0099450 A1 Mar. 26, 2020

(30) Foreign Application Priority Data
Apr. 10, 2017 (JP) .............................. JP2017-077321

(51) Int. Cl.
H04B 10/294 (2013.01)
H04J 14/02 (2006.01)

(52) U.S. Cl.
CPC ........ H04B 10/294 (2013.01); H04J 14/0221 (2013.01)

(58) Field of Classification Search
None
See application file for complete search history.

(56) References Cited

U.S. PATENT DOCUMENTS 6,606,188 B2 8/2003 Shimojoh
6,798,567 B2 * 9/2004 Feldman .............. H04B 10/296
359/341.42
6,980,745 B2 12/2005 Deguchi et al.
(Continued)

FOREIGN PATENT DOCUMENTS

JP 2003-174417 A 6/2003
JP 2012-105223 A 5/2012
(Continued)

OTHER PUBLICATIONS

International Search Report for PCT Application No. PCT/JP2018/014566, dated Jul. 3, 2018.
(Continued)

Primary Examiner — Darren E Wolf
(74) Attorney, Agent, or Firm — Sughrue Mion, PLLC

(57) ABSTRACT

A repeater includes a pump light supplier configured to generate pump light; a first multiplexer configured to multiplex the pump light and a first wavelength division multiplexed optical signal; a second multiplexer configured to multiplex the pump light and a second wavelength division multiplexed optical signal; a first amplifier configured to amplify the first wavelength division multiplexed optical signal by use of the pump light; a second amplifier configured to amplify the second wavelength division multiplexed optical signal by use of the pump light; and a controller configured to control power of the pump light output to the first multiplexer and the second multiplexer, based on wavelength information about at least one of the first wavelength division multiplexed optical signal and the second wavelength division multiplexed optical signal.

17 Claims, 15 Drawing Sheets

(56) References Cited

U.S. PATENT DOCUMENTS

| | | | | |
|---|---|---|---|---|
| 2001/0010585 A1* | 8/2001 | Nishimura | H04B 10/2916 | 398/79 |
| 2002/0097480 A1* | 7/2002 | Dominic | H04B 10/2916 | 359/333 |
| 2002/0109906 A1* | 8/2002 | Grubb | H04B 10/2935 | 359/334 |
| 2003/0076577 A1* | 4/2003 | Dominic | H04B 10/2916 | 359/334 |
| 2005/0259316 A1* | 11/2005 | Stephens | H04B 10/298 | 359/334 |
| 2012/0121255 A1 | 5/2012 | Sakamoto | | |
| 2012/0218625 A1 | 8/2012 | Mino | | |
| 2013/0121693 A1 | 5/2013 | Tanaka et al. | | |
| 2013/0222890 A1* | 8/2013 | Sakauchi | H01S 3/094061 | 359/337.11 |
| 2014/0064724 A1 | 3/2014 | Naito | | |
| 2015/0125145 A1 | 5/2015 | Takeyama | | |
| 2019/0052390 A1 | 2/2019 | Mikami | | |

FOREIGN PATENT DOCUMENTS

| | | |
|---|---|---|
| JP | 2012-175091 A | 9/2012 |
| JP | 2013-106272 A | 5/2013 |
| JP | 2013-123205 A | 6/2013 |
| JP | 2014-049988 A | 3/2014 |
| JP | 2015-091003 A | 5/2015 |
| WO | 2012/053320 A1 | 4/2012 |
| WO | 2017/056438 A1 | 4/2017 |

OTHER PUBLICATIONS

English translation of Written opinion for PCT Application No. PCT/JP2018/014566.

Japanese Office Action for JP Application No. 2019-512479 dated Nov. 17, 2020 with English Translation.

Extended European Search Report for EP Application No. EP18783740.6 dated Mar. 11, 2020.

* cited by examiner

REPEATER AND REPEATING METHOD

This application is a National Stage Entry of PCT/JP2018/014566 filed on Apr. 5, 2018, which claims priority from Japanese Patent Application 2017-077321 filed on Apr. 10, 2017, the contents of all of which are incorporated herein by reference, in their entirety.

TECHNICAL FIELD

The present invention relates to a repeater and a repeating method, and particularly relates to an optical repeater including an optical amplifier and a repeating method using the optical repeater.

BACKGROUND ART

FIG. 14 is a diagram illustrating a configuration example of a common submarine optical communication system 900. In order to transmit an optical signal from a land terminal device 901 to a land terminal device 902, repeaters 903 each including an optical amplifier are arranged. The repeater 903 amplifies optical signal power reduced by propagation through an optical fiber.

FIG. 15 is a diagram illustrating a configuration example of an optical amplifier 904 included in the repeater 903. The optical amplifier 904 generally includes a pump laser diode (LD) 905, an erbium-doped fiber (EDF) 906 being an amplification medium, and a multiplexing unit 907. The multiplexing unit 907 multiplexes a transmitted optical signal (for example, a wavelength division multiplexed optical signal) and pump light output from the pump LD 905. The pump light multiplexed with the optical signal in the multiplexing unit 907 pumps the EDF 906.

Enhanced reliability of the pump LD 905, and reduced power consumption and a reduced footprint of the repeater 903 are required in the optical amplifier 904 illustrated in FIG. 15. Accordingly, a configuration including one optical amplifier including two pump LDs or a configuration including distribution of pump light to two optical amplifiers is used. Related to the present invention, PTLs 1 to 3 describe technologies of distributing pump light to a plurality of optical amplifiers.

CITATION LIST

Patent Literature

PTL 1: WO 2012/053320
PTL 2: Japanese Unexamined Patent Application Publication No. 2013-123205
PTL 3: Japanese Unexamined Patent Application Publication No. 2003-174417

SUMMARY OF INVENTION

Technical Problem

A function of flexibly changing a setting such as a function of switching an optical signal path according to communication needs or a function of changing the number of wavelengths or a wavelength band of a wavelength division multiplexed optical signal multiplexed into an optical fiber is required of the submarine optical communication system 900. In addition, it is preferable that peak power for each carrier included in a wavelength division multiplexed optical signal be kept constant even when the number of wavelengths or the wavelength band of the wavelength division multiplexed optical signal is changed. With such a requirement for flexibility and power, flexible control of power of pump light according to changes in the number of wavelengths and the wavelength band of a wavelength division multiplexed optical signal transmitted through each optical fiber constituting the submarine optical communication system 900 is required of the optical amplifier 904 constituting the repeater 903.

Object of Invention

An object of the present invention is to provide a repeater capable of flexibly controlling power of pump light.

Solution to Problem

A repeater of the present invention comprises: pump light supplying means for generating pump light; first multiplexing means for multiplexing the pump light and a first wavelength division multiplexed optical signal; second multiplexing means for multiplexing the pump light and a second wavelength division multiplexed optical signal; first amplification means for amplifying the first wavelength division multiplexed optical signal by use of the pump light; second amplification means for amplifying the second wavelength division multiplexed optical signal by use of the pump light; and control means for controlling power of the pump light output to the first multiplexing means and the second multiplexing means, based on wavelength information about the first wavelength division multiplexed optical signal and the second wavelength division multiplexed optical signal.

A repeating method on the present invention comprises: generating pump light; multiplexing the pump light and a first wavelength division multiplexed optical signal; multiplexing the pump light and a second wavelength division multiplexed optical signal; amplifying the first wavelength division multiplexed optical signal by use of the pump light; amplifying the second wavelength division multiplexed optical signal by use of the pump light; acquiring wavelength information of the first wavelength division multiplexed optical signal and the second wavelength division multiplexed optical signal; and controlling power of the pump light, based on the wavelength information.

Advantageous Effects of Invention

The present invention can provide a repeater capable of controlling power of pump light flexibly.

EXAMPLE EMBODIMENT

Example embodiments of the present invention will be described below. In descriptions of the example embodiments and drawings, a previously described component is given the same reference sign, thus omitting overlapping description thereof.

First Example Embodiment

Figure 1:
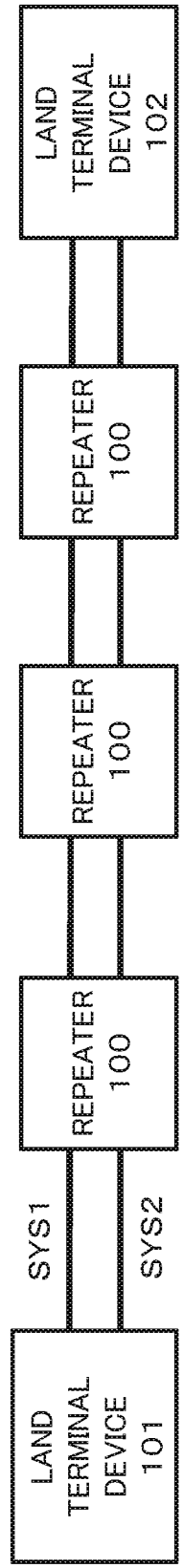
FIG. 1 is a block diagram illustrating a configuration example of a submarine optical communication system 10 according to a first example embodiment.

FIG. 1 is a block diagram illustrating a configuration example of a submarine optical communication system 10 according to a first example embodiment of the present invention. The submarine optical communication system 10 includes land terminal devices 101 and 102 (first and second land terminal devices), and repeaters 100. The repeaters 100 each including an optical amplifier are arranged at predetermined intervals on the seabed. The land terminal devices 101 and 102, and the repeaters 100 are connected by optical fiber cables. The repeater 100 amplifies optical signal power reduced by propagation through the optical fiber.

A wavelength division multiplexed (WDM) optical signal is transmitted between the land terminal device 101 and the land terminal device 102. There are two systems of transmission lines between the land terminal device 101 and the land terminal device 102, each described as a system (SYS) 1 and a SYS 2. Directions of a WDM optical signal (first wavelength division multiplexed optical signal) transmitted over the SYS 1 and a WDM optical signal (second wavelength division multiplexed optical signal) transmitted over the SYS 2 may be the same or different. Further, each of the number of wavelengths and the wavelength band of the WDM optical signal transmitted over the SYS 1 and the WDM optical signal transmitted over the SYS 2 may be the same or different.

Figure 2:
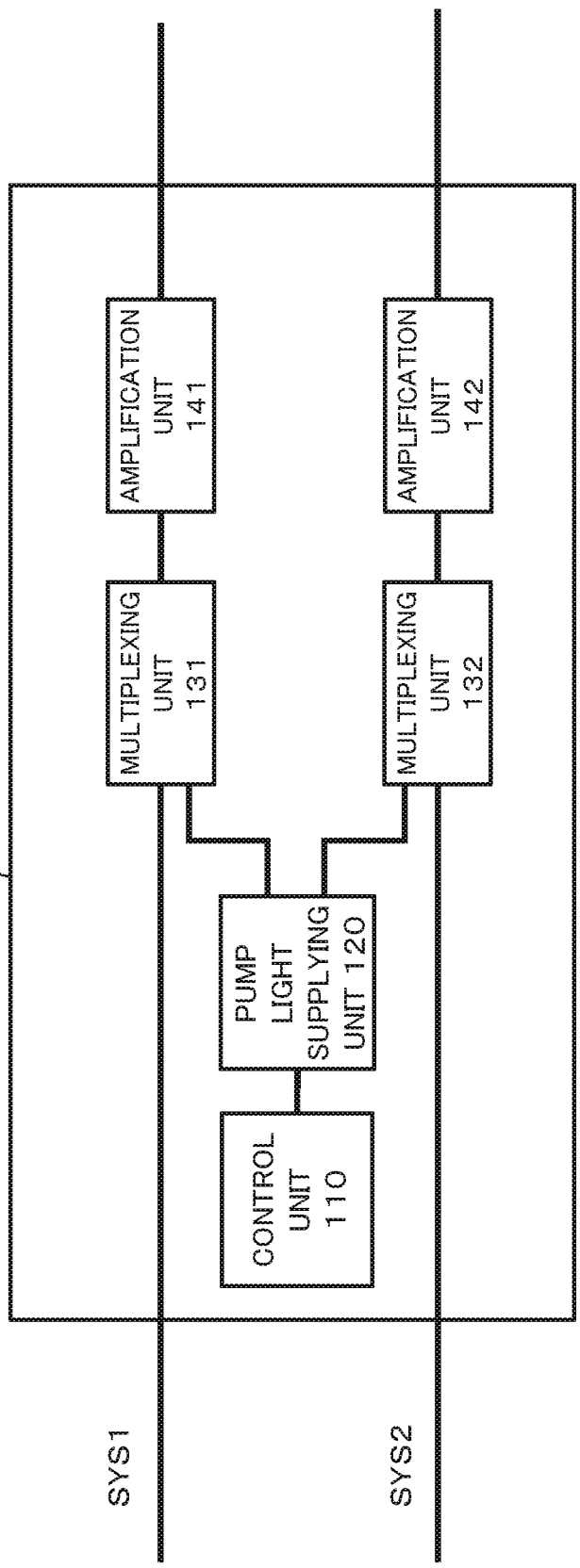
FIG. 2 is a block diagram illustrating a configuration example of a repeater 100 according to the first example embodiment.

FIG. 2 is a block diagram illustrating a configuration example of the repeater 100 according to the first example embodiment. The repeater 100 includes a control unit 110, a pump light supplying unit 120, multiplexing units 131 and 132, and amplification units 141 and 142.

The pump light supplying unit 120 serves as a pump light supplying means for generating pump light. The multiplexing unit 131 serves as a first multiplexing means for multiplexing pump light and a first wavelength division multiplexed optical signal. The multiplexing unit 132 serves as a second multiplexing means for multiplexing pump light and a second wavelength division multiplexed optical signal. The amplification unit 141 serves as a first amplification means for amplifying the first wavelength division multiplexed optical signal by use of the pump light. The amplification unit 142 serves as a second amplification means for amplifying the second wavelength division multiplexed optical signal by use of the pump light. The control unit 110 serves as a control means for controlling power of pump light (hereinafter referred to as "pump light power") output to the first and second multiplexing means, based on information about wavelengths (hereinafter referred to as "wavelength information") of the first and second wavelength division multiplexed optical signals.

The repeater 100 in FIG. 2 including the above has a function as an optical amplifier. Note that, since configurations of a monitoring function of an optical signal and a control function of a power source implemented in the repeater 100 are generally known, illustrations in the drawings and description thereof are omitted.

The repeater 100 amplifies WDM optical signals transmitted over two optical transmission lines SYS 1 and SYS 2. The pump light supplying unit 120 includes at least one pump light source. The pump light supplying unit 120 supplies pump light to the amplification units 141 and 142 through the multiplexing unit 131 or 132.

The control unit 110 controls pump light supplied to the amplification units 141 and 142 by the pump light supplying unit 120. The control unit 110 controls optical power of pump light distributed to the multiplexing units 131 and 132, based on wavelength information of WDM optical signals transmitted over the SYS 1 and the SYS 2. Each of the multiplexing units 131 and 132 multiplexes pump light output by the pump light supplying unit 120 and an input WDM optical signal. An optical coupler (directional coupler), an optical wavelength multiplexer, or a wavelength selective switch (WSS) may be used as each of the multiplexing units 131 and 132. Each of the amplification units 141 and 142 is an amplification medium and amplifies a WDM optical signal with pump light supplied from the pump light supplying unit 120.

Figure 3:
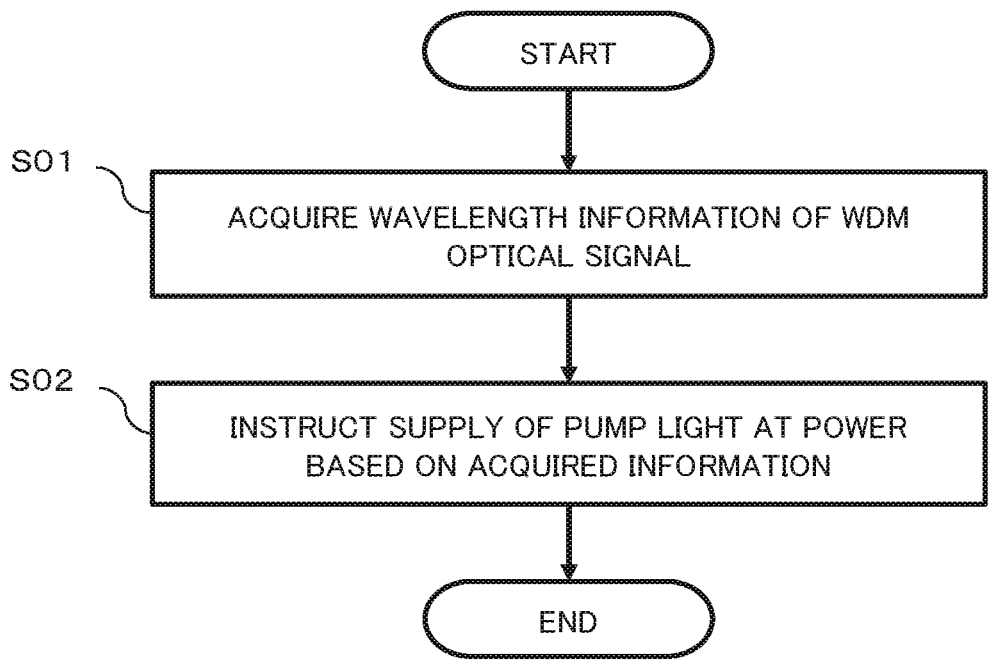
FIG. 3 is a diagram illustrating an example of a control procedure of the repeater 100 according to the first example embodiment.

FIG. 3 is an example of a flowchart of an operation of the control unit 110 according to the first example embodiment. The control unit 110 acquires wavelength information of a WDM optical signal transmitted over at least one of the SYS 1 and the SYS 2 (Step S01 in FIG. 3). Then, the control unit 110 instructs the pump light supplying unit 120 to supply pump light at power based on the acquired wavelength information (Step S02).

The pump light supplying unit 120 outputs, to the multiplexing units 131 and 132, pump light at power based on the instruction from the control unit 110. Pump light power output to each of the multiplexing units 131 and 132 may differ each other. Each of the amplification units 141 and 142 amplifies the WDM optical signal according to the supplied pump light power and outputs the amplified signal from the repeater 100. The control unit 110 may include a computer, such as a central processing unit (CPU), and a storage device, such as a semiconductor memory, as hardware. Then, the function of the control unit 110 may be provided by the CPU executing a computer program stored in the storage device being the procedure in FIG. 3.

The repeater 100 with such a configuration controls the pump light supplying unit 120, based on wavelength information of a WDM optical signal, and therefore can flexibly control pump light power.

Second Example Embodiment

Figure 4:
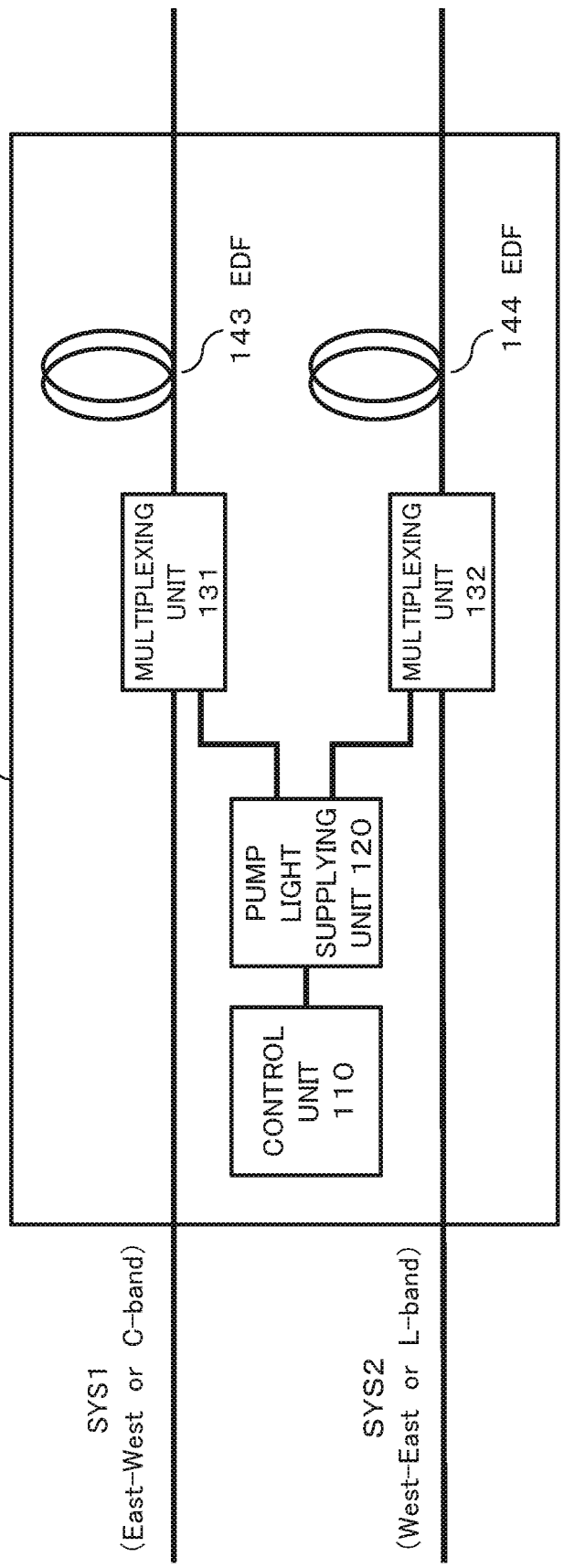
FIG. 4 is a block diagram illustrating a configuration example of a repeater 200 according to a second example embodiment.

FIG. 4 is a block diagram illustrating a configuration example of a repeater 200 according to a second example embodiment. The repeater 200 is an embodiment of the repeater 100 described in the first example embodiment. The repeater 200 includes Er-doped fibers (EDF) 143 and 144 as the amplification units 141 and 142 in FIG. 2. A SYS 1 and a SYS 2 are different lines and are, for example, an upstream line and a downstream line connecting a land terminal devices 101 and 102 at two locations. Two lines connecting such land terminal devices may be referred to as an "East-West line" and a "West-East line."

Transmission directions of the SYS 1 and the SYS 2, according to the present example embodiment, may be the same. Further, the SYS 1 and the SYS 2 may use different numbers of wavelengths and wavelength bands. For example, the SYS 1 may transmit a C-band WDM optical signal, and the SYS 2 may transmit an L-band WDM optical signal. "C-band" refers to a wavelength band approximately from 1530 nm to 1565 nm, and "L-band" refers to a wavelength band approximately from 1570 nm to 1610 nm.

Pump light power supplied to the SYS 1 and the SYS 2 from a pump light supplying unit 120 is controlled in such a way that peak power of each carrier of WDM optical signals transmitted over the SYS 1 and the SYS 2 has a predetermined value. Pump light power required for setting peak power for each carrier to the predetermined value varies by wavelength information of the WDM optical signal. Accordingly, a control unit 110 stores a relation between a wavelength information of a WDM optical signal and pump light power required for amplifying a carrier of the WDM optical signal corresponding to the wavelength information to be at the predetermined peak power. For example, the control unit 110 may internally store pump LD power related to wavelength information of an in-service WDM optical signal in advance as a table. The pump LD will be described in FIG. 5 and later. The control unit 110 may search the table for pump light power with set wavelength information of a WDM optical signal as a key. Wavelength information of a WDM optical signal may be set by the control unit 110 upon installation of the repeater 200. Set wavelength information may be changed by maintenance work of the repeater 200. The control unit 110 acquires set wavelength information of a WDM optical signal and instructs the pump light supplying unit 120 to supply pump light power related to the information. The pump light supplying unit 120 outputs pump light at the power instructed by the control unit 110 to multiplexing units 131 and 132. With such a configuration, the pump light supplying unit 120 provides flexible control of pump light power.

A case of wavelength information being information about the number of wavelengths and information about a wavelength band of a WDM optical signal will be described in the present example embodiment and later. However, wavelength information may be either or both of wavelength information of a WDM optical signal over the SYS 1 and wavelength information of a WDM optical signal over the SYS 2. Further, wavelength information may be either or both of the number of wavelengths information and the wavelength band information of a WDM optical signal. In other words, wavelength information includes at least one item of the number of wavelengths information of a WDM optical signal over the SYS 1, the wavelength band information of the WDM optical signal over the SYS 1, the number of wavelengths information of a WDM optical signal over the SYS 2, and the wavelength band information of the WDM optical signal over the SYS 2.

Figure 5:
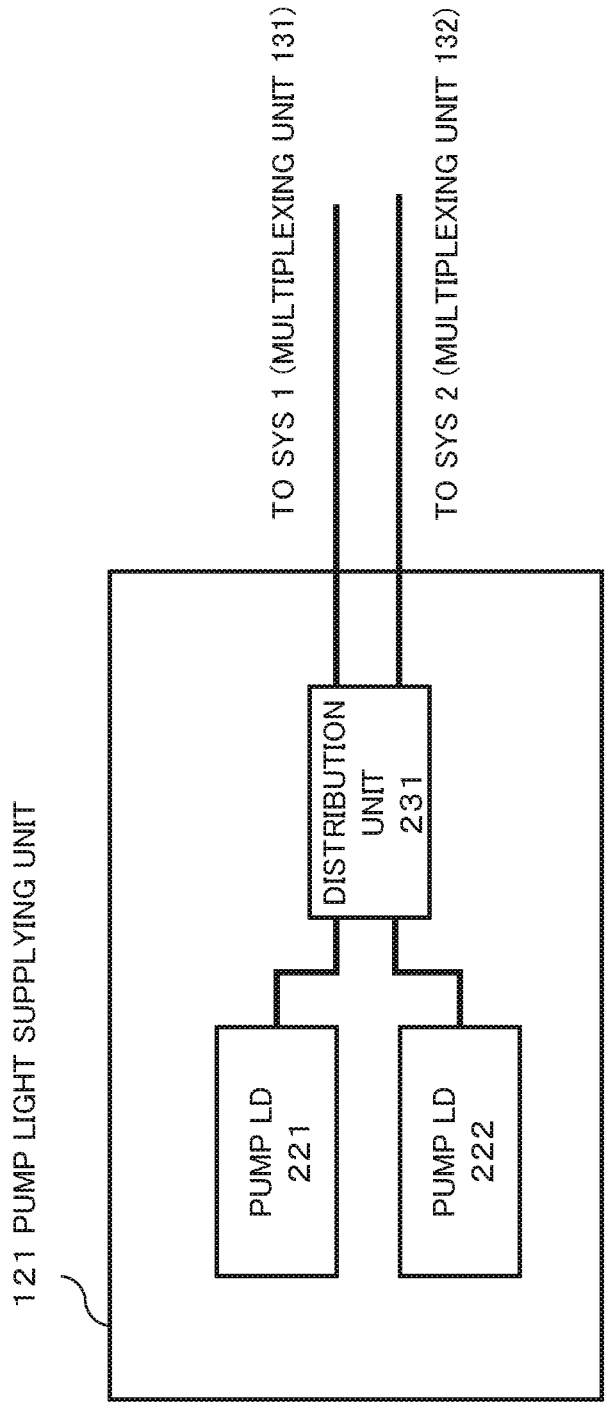
FIG. 5 is a block diagram illustrating a configuration example of a pump light supplying unit 121.

Specific configuration examples of the pump light supplying unit 120 will be described below as pump light supplying units 121 to 126. FIG. 5 is a block diagram illustrating a configuration example of the pump light supplying unit 121. The pump light supplying unit 121 includes pump laser diodes (LDs) 221 and 222, and a distribution unit 231. Power of each of the pump LDs 221 and 222 is controlled by the control unit 110, based on information about the number of wavelengths and the wavelength band of WDM optical signals transmitted over the SYS 1 and the SYS 2. A pump LD with a wavelength in a 0.98 μm band or a 1.48 μm band may be used as each of the pump LDs 221 and 222. There may be only one of the pump LDs 221 and 222; however, having two pump LDs allows redundancy of the pump LD and increases pump light power. The pump LD functions as a pump light source generating pump light for the EDFs 143 and 144.

The distribution unit 231 serves as a distribution means for distributing an output of a pump light source to the multiplexing units 131 and 132. The distribution unit 231 distributes input pump light to the multiplexing unit 131 on the SYS 1 and the multiplexing unit 132 on the SYS 2. For example, the distribution unit 231 is a 2×2 optical coupler. However, as will be described in the present example embodiment and later, the distribution unit 231 is not limited to a 2×2 optical coupler.

The pump light supplying unit 121 provides flexible control of pump light power by controlling the pump LDs 221 and 222, based on information about the number of wavelengths and the wavelength band of a WDM optical signal.

Figure 6:
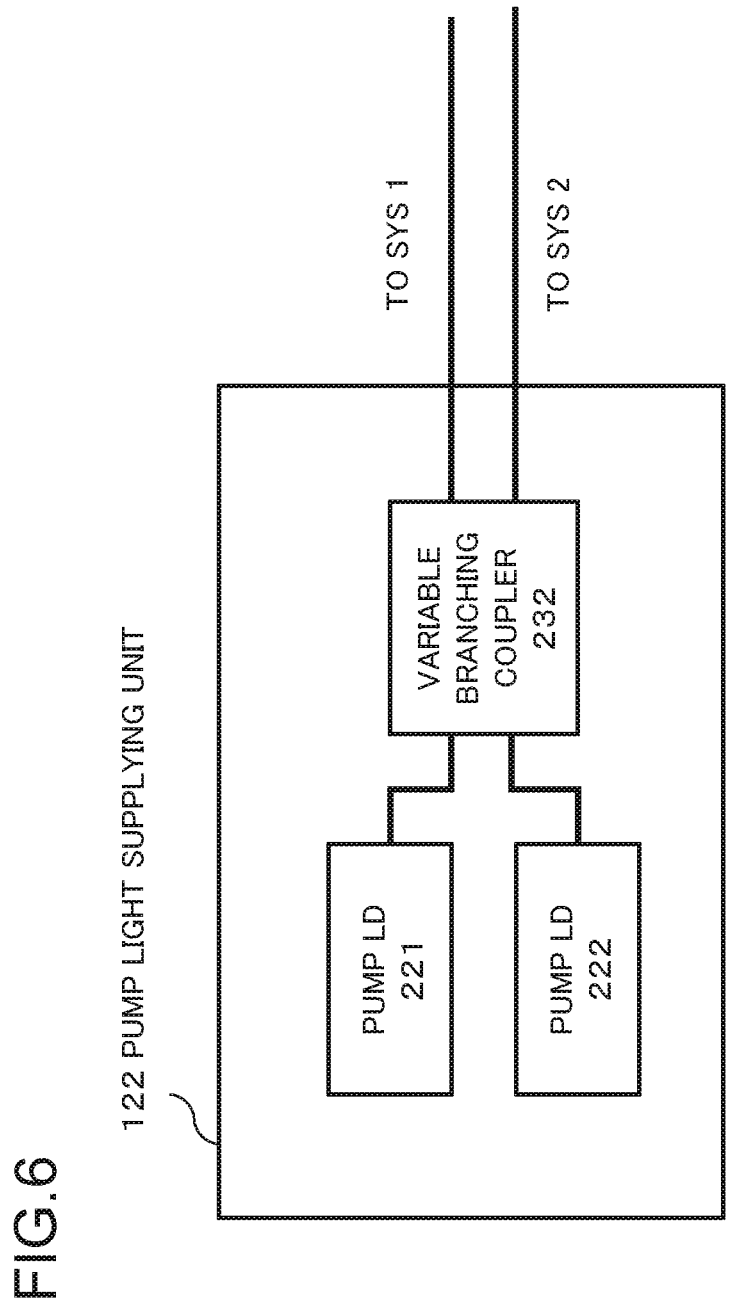
FIG. 6 is a block diagram illustrating a configuration example of a pump light supplying unit 122.

FIG. 6 is a block diagram illustrating a configuration example of the pump light supplying unit 122. The pump light supplying unit 122 includes pump LDs 221 and 222, and a variable branching coupler 232. There may be only one of the pump LDs 221 and 222, similarly to the pump light supplying unit 121.

The variable branching coupler 232 is a coupler with a variable branching ratio, and the control unit 110 controls a power of the pump LDs 221 and 222 and a branching ratio of the variable branching coupler 232, based on information about the number of wavelengths and the wavelength band. In other words, the pump light supplying unit 122 can change a ratio between pump light power distributed to the SYS 1 and the SYS 2. Accordingly, even when the number of wavelengths and the wavelength band of a WDM optical signal differ between the SYS 1 and the SYS 2, the pump light supplying unit 122 can flexibly distribute pump light to the SYS 1 and the SYS 2 in such a way as to set peak power for each carrier to a predetermined value. An optical waveguide type 2×2 coupler using a Mach-Zehnder interferometer is known as a specific example of the variable branching coupler 232.

Thus, the pump light supplying unit 122 provides flexible control of pump light power by using the variable branching coupler 232.

Figure 7:
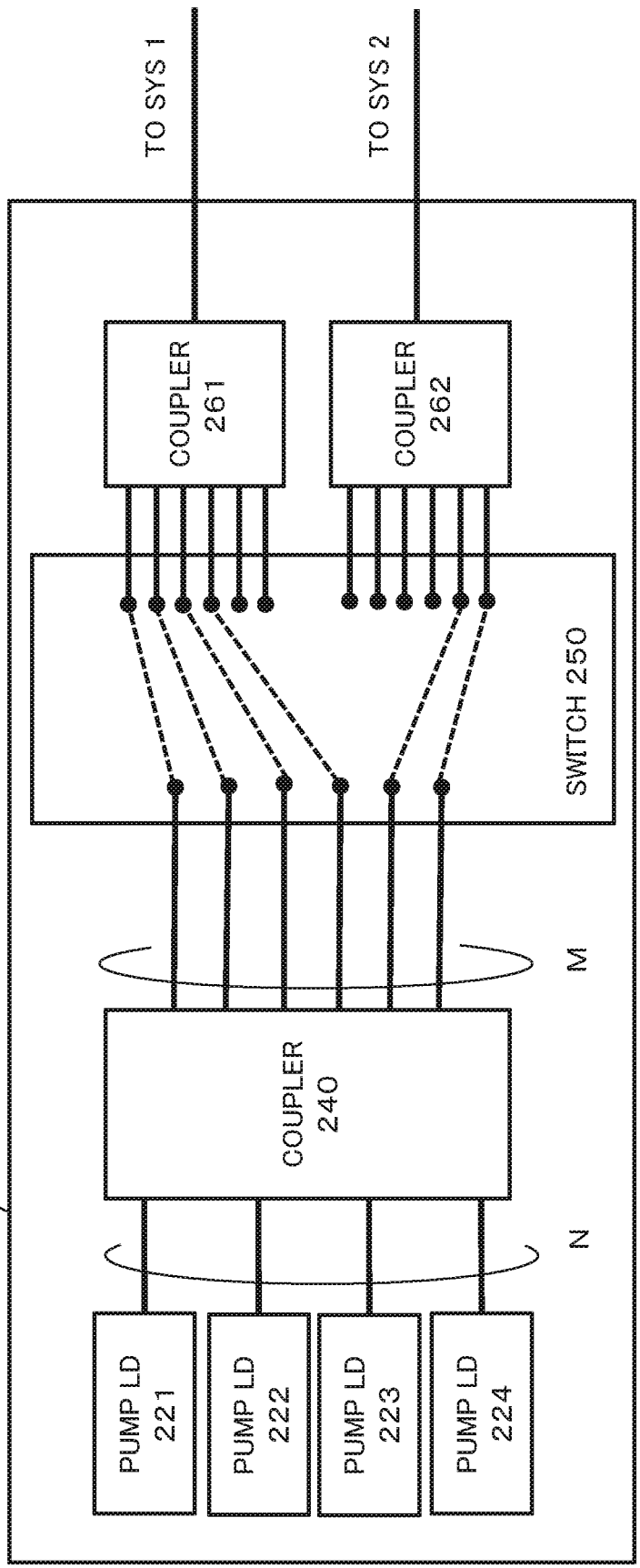
FIG. 7 is a block diagram illustrating a configuration example of a pump light supplying unit 123.

FIG. 7 is a block diagram illustrating a configuration example of the pump light supplying unit 123. The pump light supplying unit 123 includes four pump LDs 221 to 224, a coupler 240 (first coupler), couplers 261 and 262 (second and third couplers), and a switch 250. The couplers 240, 261, and 262, and the switch 250 correspond to the distribution unit 231 in FIG. 5. The coupler 240 is a 4×6 optical coupler with 4 input ports and 6 output ports, and the switch 250 is a 6×12 optical switch with 6 input ports and 12 output ports. Each of the coupler 261 and the coupler 262 is a 6×1 optical coupler with 6 input ports and 1 output port. The number of ports in FIG. 7 is an example. The configuration in FIG. 7 is generally expressed as N pump LDs 221 to 22N, an N×M optical coupler 240 coupling outputs of the pump LDs 221 to 22N and outputting the coupled signals from a plurality of ports, an M×2M optical switch 250, and 2M×1 optical couplers 261 and 262. N is a natural number, and M is a natural number greater than or equal to 2.

In other words, there are M optical paths between the coupler 240 and the switch 250, and there are also M optical paths between the switch 250 and the coupler 261, and M optical paths between the switch 250 and the coupler 262. The coupler 240 couples N beams of pump light output from the pump LDs, and splits the coupled beams into M output beams. The switch 250 can switch internal connections in such a way as to output each of the M input beams of pump light to one of the coupler 261 and the coupler 262. The couplers 261 and 262 couple beams of pump light connected in the switch 250 and output the coupled light to the multiplexing units 131 and 132, respectively. FIG. 7 illustrates a case of N=4 and M=6.

Based on information about the number of wavelengths and the wavelength band of a WDM optical signal, the control unit 110 controls power of the pump LDs 221 to 224 and also selects an input port and an output port connected by the switch 250. By selecting the number of ports of pump light connected to the coupler 261 and the coupler 262, the switch 250 can control pump light power distributed to the multiplexing units 131 and 132 and a ratio between the two. For example, in FIG. 7, the switch 250 outputs pump light to four ports on the coupler 261 and outputs pump light to two ports on the coupler 262. Accordingly, pump light power output to the multiplexing unit 131 on the SYS 1 is twice that output to the multiplexing unit on the SYS 2. By increasing or decreasing the number of beams of pump light connected by the switch 250, the pump light supplying unit 123 can independently increase or decrease pump light power supplied to the SYS 1 and the SYS 2.

Two optical paths may be provided between the switch 250 and the coupler 261, the two optical paths may be configured with polarization maintaining optical fibers, and a 2×1 polarization combining coupler may be used as the coupler 261. By polarization-combining beams of pump light output from the two polarization maintaining optical fibers, the coupler 261 can output pump light having total power of the two input beams of pump light to the multiplexing unit 131. Similarly, by connecting the switch 250 to the coupler 262 by two polarization maintaining optical fibers and using a polarization combining coupler as the coupler 262, the coupler 262 can output pump light having total power of the input beams of pump light to the multiplexing unit 132.

Thus, by controlling the switch 250, the pump light supplying unit 123 provides flexible control of pump light power.

Figure 8:
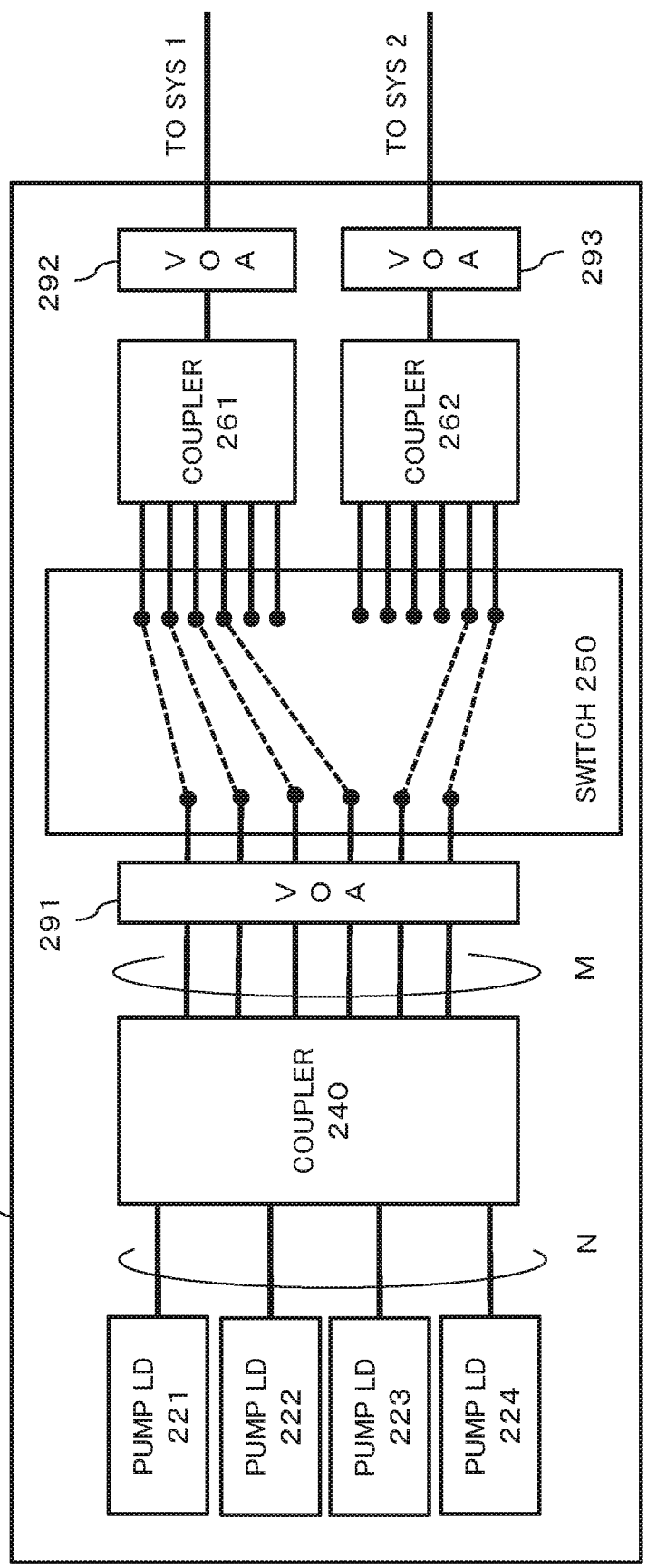
FIG. 8 is a block diagram illustrating a configuration example of a pump light supplying unit 124.

FIG. 8 is a block diagram illustrating a configuration example of the pump light supplying unit 124. The pump light supplying unit 124 includes variable optical attenuators (VOAs) 291 to 293 in addition to the configuration of the pump light supplying unit 123. The VOA 291 can adjust pump light power input to a switch 250 for each optical path. The VOAs 292 and 293 can adjust pump light power output from couplers 261 and 262, respectively. The control unit 110 controls attenuation of the VOAs 291 to 293, based on information about the number of wavelengths and the wavelength band. With such a configuration, the pump light supplying unit 124 can more precisely control pump light.

The pump light supplying unit 124 may include at least one of the VOAs 291 to 293. A VOA may be installed between pump LDs 221 to 224 and the output of the coupler 261.

Figure 9:
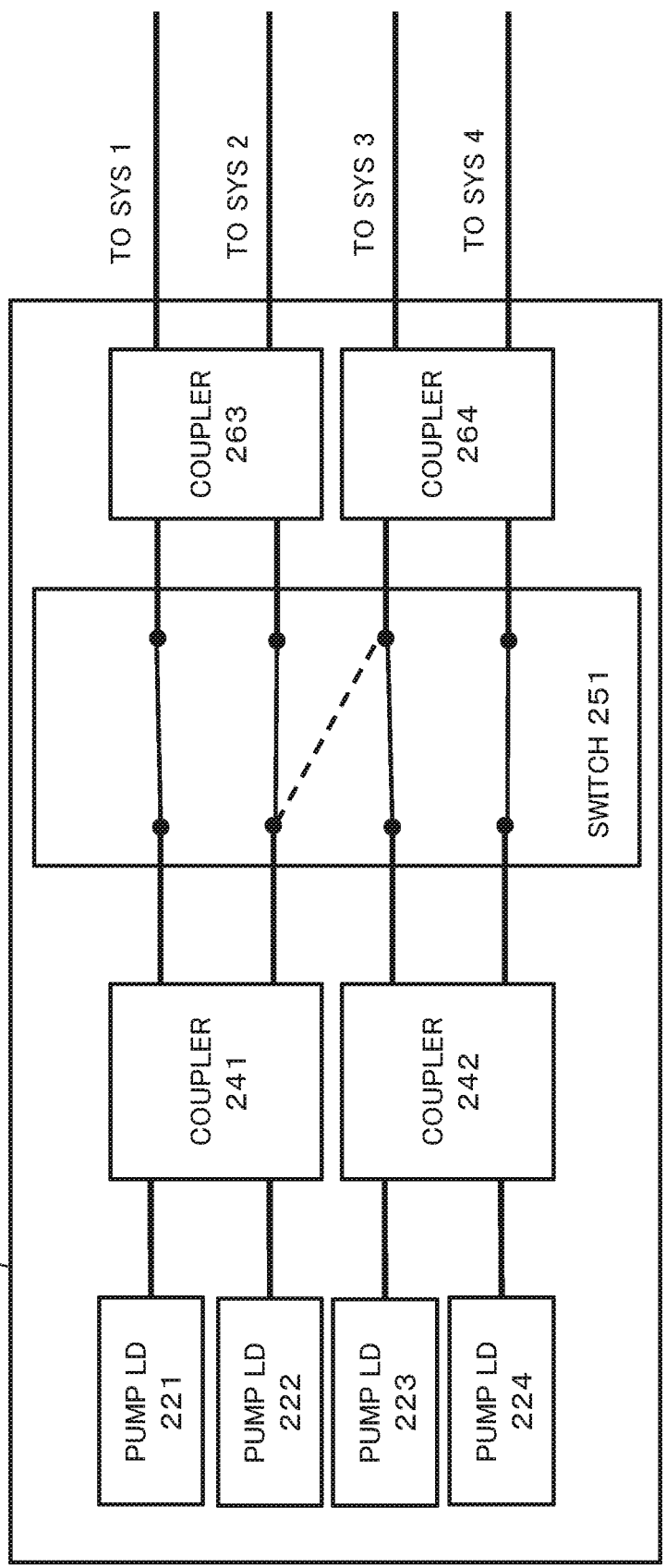
FIG. 9 is a block diagram illustrating a configuration example of a pump light supplying unit 125.

FIG. 9 is a block diagram illustrating a configuration example of the pump light supplying unit 125. The pump light supplying unit 125 includes four pump LDs 221 to 224, couplers 241, 242, 263, and 264, and a switch 251. The couplers 241, 242, 263, and 264, and the switch 251 correspond to the distribution unit 231 in FIG. 5. Each of the couplers 241, 242, 263, and 264 is a 2×2 optical coupler and the switch 251 is a 4×4 optical switch. There are two optical paths between the switch 251 and the coupler 263, and there are also two optical paths between the switch 251 and the coupler 264.

Since each of the couplers 263 and the 264 is a 2×2 optical coupler, outputs of the coupler 263 may be output to the SYS 1 and the SYS 2, and outputs of the coupler 264 may be output as pump light for amplification units included on a SYS 3 and a SYS 4 being yet other transmission lines.

The switch 251 can selectively output one of the beams of pump light input from the coupler 241 to the coupler 263 or the coupler 264. Further, the switch 251 can selectively output one of the beams of pump light input from the coupler 242 to either the coupler 264 or the coupler 263. With such a configuration, the pump light supplying unit 125 can distribute outputs of the pump LDs 221 to 224 to the coupler 263 and the coupler 264. For example, in a case of a failure of the pump LD 223 or 224 when the inside of the switch 251 has connections as illustrated in solid lines, pump light power output from the coupler 264 is reduced. In this case, by controlling the switch 251 in such a way as to change the output destination of one of the inputs from the coupler 241 from the coupler 263 to the coupler 264 as illustrated in a broken line, the reduction in pump light power input to the coupler 264 can be compensated for. Consequently, reduction in pump light power supplied to the SYS 3 and the SYS 4 can be suppressed. Similarly, when the pump LD 221 or 222 fails, the switch 251 may be controlled in such a way that one of the outputs of the coupler 242 is output to the coupler 263.

The control unit 110 performs acquisition of operating states of the pump LDs 221 to 224, power control of the pump LDs, and control of the switch 251. The control unit 110 may internally store information about the number of wavelengths and a wavelength band of a WDM optical signal, operating states of the pump LDs 221 to 224, and power of the pump LDs 221 to 224 related to a switching state of the switch 251, in advance as a table. The control unit 110 may search the table for pump light power with wavelength information of a WDM optical signal, an operating state of the pump LDs 221 to 224, and a switching state of the switch 251 as keys.

The pump LD 221 and the pump LD 222 may operate simultaneously or may be configured in such a way that only the pump LD 221 operates under normal conditions and switching to the pump LD 222 is performed when the other fails. The same applies to the pump LDs 223 and 224.

Thus, the pump light supplying unit 125 provides flexible control of pump light power by controlling the pump LDs 221 to 224 and the switch 251.

Figure 10:
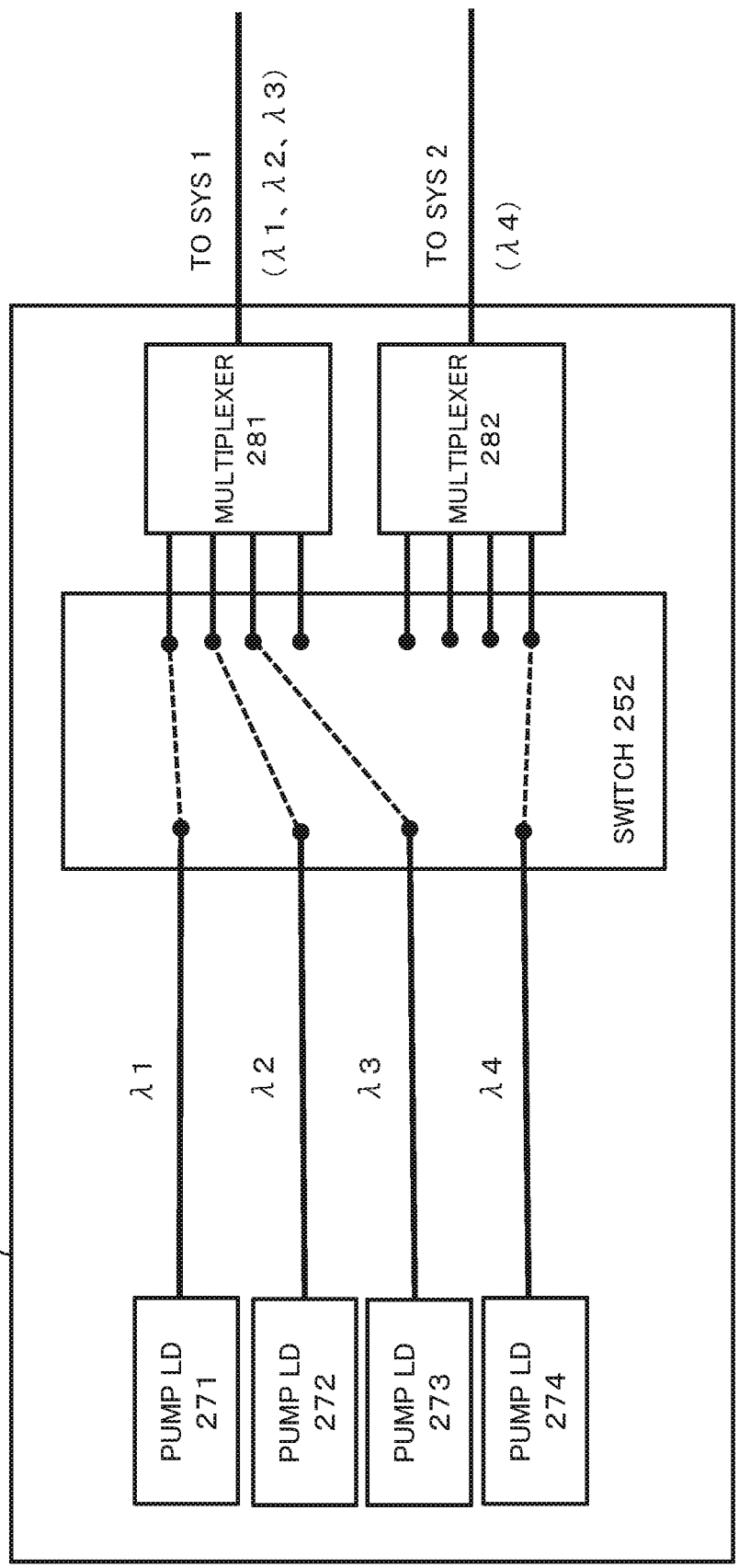
FIG. 10 is a block diagram illustrating a configuration example of a pump light supplying unit 126.

FIG. 10 is a block diagram illustrating a configuration example of the pump light supplying unit 126. A switch 252, and multiplexers 281 and 282 (third and fourth multiplexing means) correspond to the distribution unit 231 in FIG. 5. Wavelengths λ1 to λ4 of beams of pump light generated by pump LDs 271 to 274 are different from one another. The switch 252 is a 4×8 optical switch with four inputs and eight outputs. Four of the outputs of the switch 252 are connected to the multiplexer 281, and four are connected to the multiplexer 282. Each of the multiplexers 281 and 282 wavelength-multiplexes beams of pump light input from the switch 252 and outputs the multiplexed light.

Based on information about the number of wavelengths and the wavelength band of a WDM optical signal, the control unit 110 controls power of the pump LDs 271 to 274 and also switches connections between the input ports and the output ports of the switch 252. The switch 252 can control pump light power distributed to the SYS 1 and the SYS 2, and a ratio thereof, by selecting a wavelength and the number of beams of pump light connected to the multiplexers 281 and 282. Specifically, the switch 252 selects one to four beams out of the four input beams of pump light (wavelengths λ1 to λ4) and outputs the selected beam(s) to the multiplexer 281, and selects one to four beams out of the remaining beam(s) of pump light and outputs the selected beam(s) to the multiplexer 282. FIG. 10 illustrates an example of beams of pump light from the pump LDs 271 to 273 (wavelengths λ1 to λ3) being output to the multiplexing unit 131, and a beam of pump light from the pump LD 274 (wavelength λ4) being output to the multiplexing unit 132.

By controlling the switch 252, the control unit 110 can select pump light input to the multiplexer 281 and pump light input to the multiplexer 282. When power of each of the pump LDs 271 to 274 is approximately equal, pump light power supplied to each of the SYS 1 and the SYS 2 is approximately proportional to the number of beams of pump light selected by the switch 252. The pump light supplying unit 126 with such a configuration can also flexibly control pump light power by selecting the number of beams of pump light to be wavelength division multiplexed.

Figure 11:
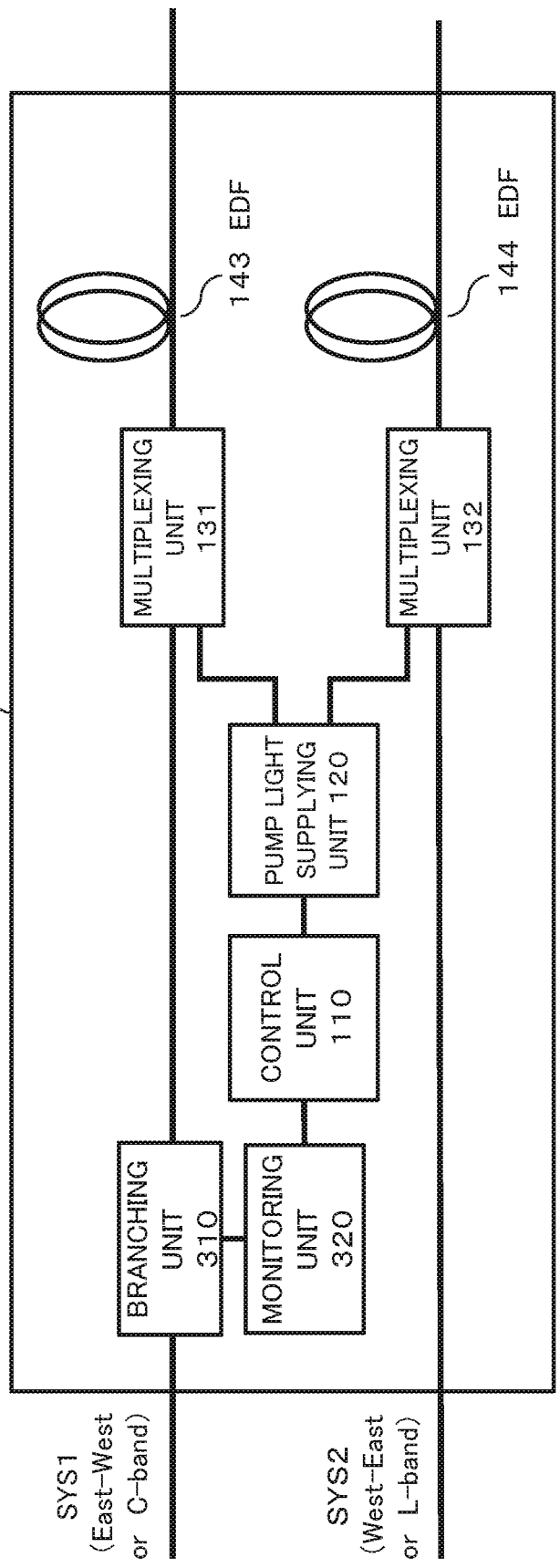
FIG. 11 is a block diagram illustrating a configuration example of a repeater 300 according to a third example embodiment.

FIG. 11 is a block diagram illustrating a configuration example of a repeater 300 according to a third example embodiment. The repeater 300 includes a branching unit 310 and a monitoring unit 320 in addition to the configuration of the repeater 200 according to the second example embodiment. The branching unit 310 serves as a branching means for splitting at least one of a WDM optical signal over a SYS 1 and a WDM optical signal over a SYS 2.

The branching unit 310 splits part of a WDM optical signal propagating over the SYS 1 and outputs the split signal to the monitoring unit 320. The monitoring unit 320 detects the number of wavelengths included in the WDM optical signal and a wavelength band of the WDM optical signal. Such a function may be provided by an optical filter, such as a WSS, and a light receiving element. Specifically, the monitoring unit 320 identifies wavelength information of the optical signal propagating over the SYS 1 and notifies the control unit 110 of the result.

The control unit 110 controls the pump light supplying unit 120, based on wavelength information of a WDM optical signal propagating over the SYS 1, the information of which the monitoring unit 320 notified, and a table indicating pump light power related to the wavelength information. One of the aforementioned pump light supplying units 121 to 126 may be used as the pump light supplying unit 120. Further, by also installing a branching unit 310 and a monitoring unit 320 on a transmission line on the SYS 2 side, the control unit 110 may control the pump light supplying unit 120, based on information about WDM optical signals over the SYS 1 and the SYS 2, the information being detected from the WDM optical signals.

The repeater 300 can directly recognize information about an actually propagating WDM optical signal. Consequently, the repeater 300 can not only flexibly control pump light power but also perform preferable control of pump light power even when the number of wavelengths and the wavelength band of a WDM optical signal are changed.

Figure 12:
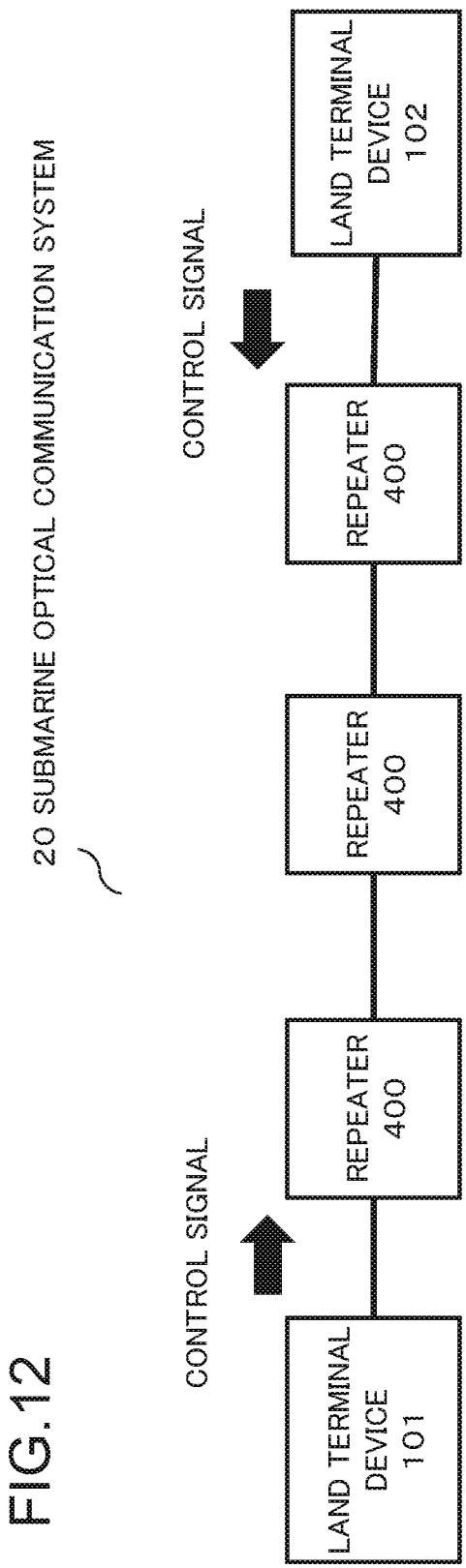
FIG. 12 is a block diagram illustrating a configuration example of a submarine optical communication system 20 according to a fourth example embodiment.

FIG. 12 is a block diagram illustrating a configuration example of a submarine optical communication system 20 according to a fourth example embodiment. A network management system, connected to a land terminal device 101 or 102, or connected to the submarine optical communication system 20, transmits a control signal to a repeater 400. The repeater 400 extracts the control signal and notifies the control unit 110 of the control signal. The control signal includes information about the number of wavelengths and the wavelength band, or information about pump light power instructed to the pump light supplying unit 120.

Figure 13:
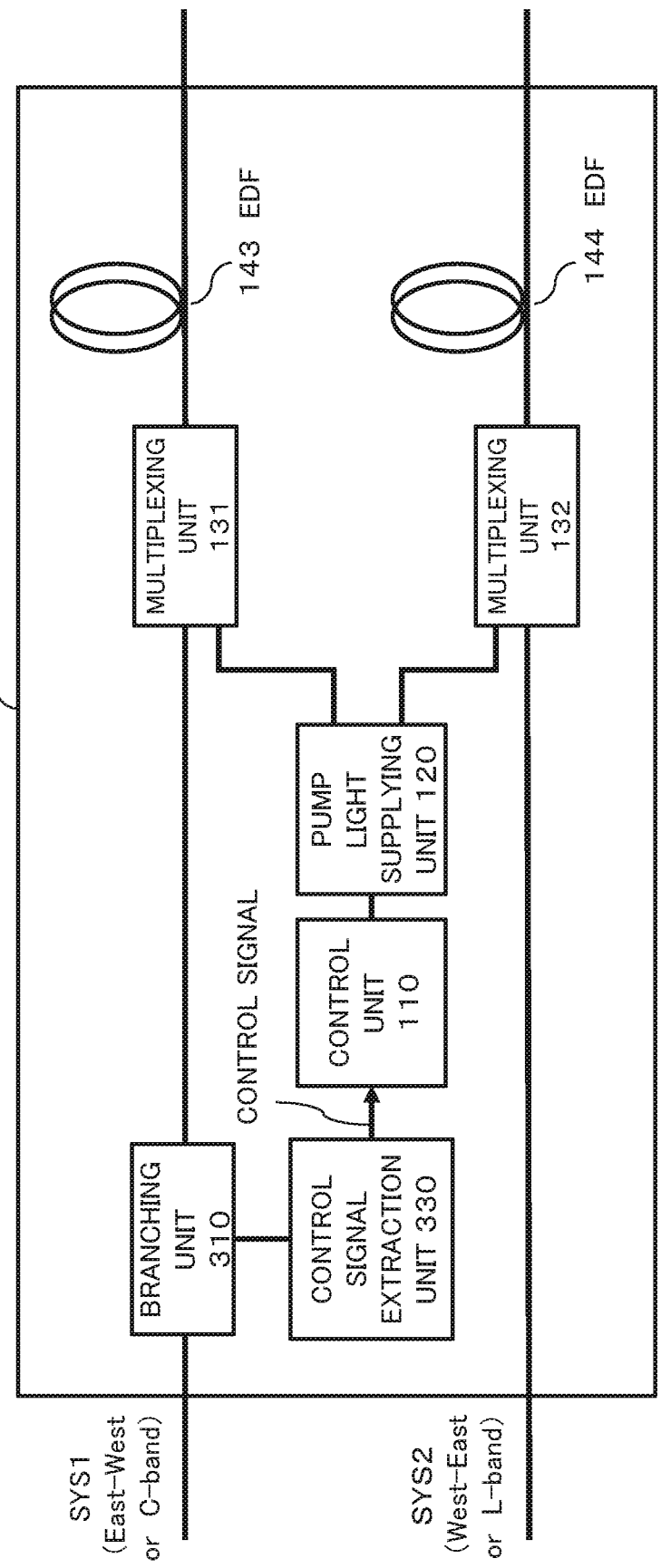
FIG. 13 is a block diagram illustrating a configuration example of a repeater 400 according to the fourth example embodiment.
Figure 14:
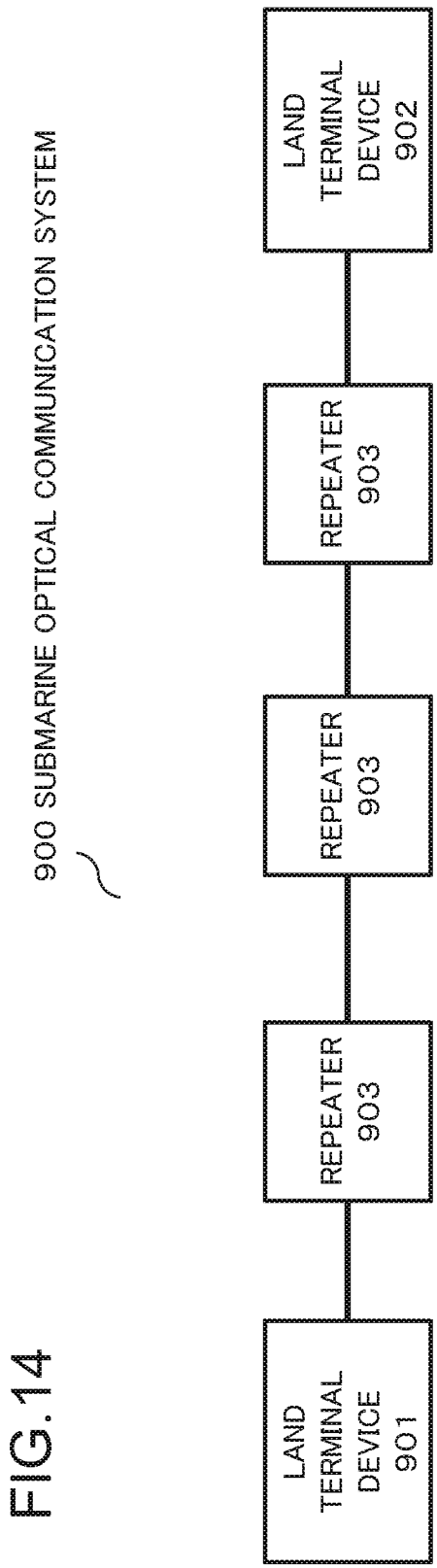
FIG. 14 is a block diagram illustrating a configuration example of a common submarine optical communication system 900.
Figure 15:
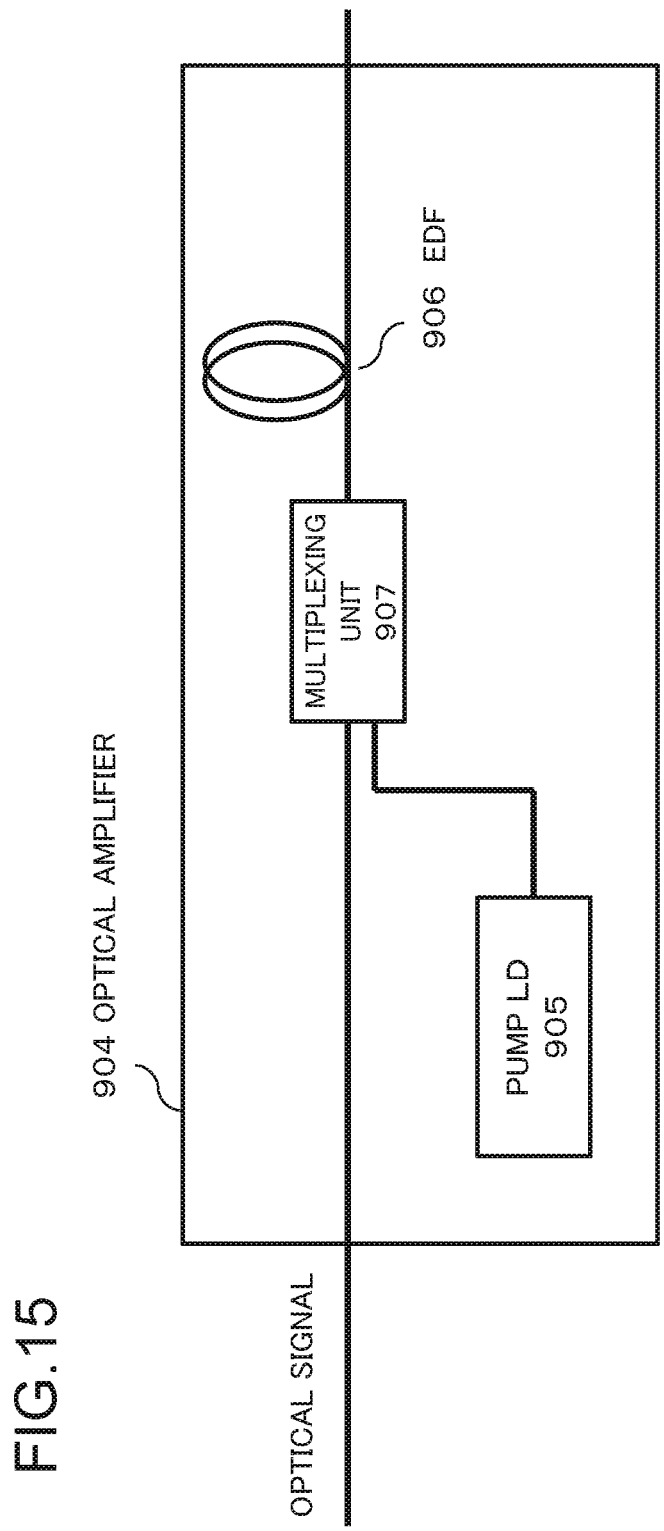
FIG. 15 is a diagram illustrating a configuration example of a common optical amplifier 904.

FIG. 13 is a block diagram illustrating a configuration example of the repeater 400 according to the fourth example embodiment. A branching unit 310 splits a WDM optical signal propagating over a SYS 1 and outputs the split signal to a control signal extraction unit 330. A control signal is superimposed on the WDM optical signal. The control signal is transmitted by a carrier of a wavelength unused for communication or by low-frequency modulation of the WDM optical signal. The control signal extraction unit 330 extracts the control signal by use of a wavelength filter or a low pass filter and notifies the control unit 110 of the control signal. The control signal extraction unit 330 serves as a control signal extraction means for extracting, from the WDM optical signal split by the branching unit 310, a control signal instructing, to the pump light supplying unit 120, pump light power to be output to multiplexing units 131 and 132, and outputting the extracted control signal to the control unit 110.

The control unit 110 controls the pump light supplying unit 120, based on information included in the control signal. Further, by also installing a branching unit 310 and a control signal extraction unit 330 for a transmission line on a SYS 2 side, similarly to the third example embodiment, the control unit 110 can control the pump light supplying unit 120, based on control signals detected from WDM optical signals over the SYS 1 and the SYS 2. An arrow attached to a control signal in FIG. 12 and FIG. 13 does not limit a direction of the control signal.

The repeater 400 according to the fourth example embodiment controls pump light power by use of a control signal extracted from a WDM optical signal. Accordingly, the repeater 400 can flexibly control pump light power and in addition, does not need to include a table for controlling pump light power, based on the number of wavelengths and the wavelength band of a WDM optical signal, in the repeater 400.

The whole or part of example embodiments disclosed above can be described as, but not limited to, the following supplementary notes.

Supplementary Note 1

A repeater comprising:
pump light supplying means for generating pump light;
first multiplexing means for multiplexing the pump light and a first wavelength division multiplexed optical signal;

second multiplexing means for multiplexing the pump light and a second wavelength division multiplexed optical signal;

first amplification means for amplifying the first wavelength division multiplexed optical signal by use of the pump light;

second amplification means for amplifying the second wavelength division multiplexed optical signal by use of the pump light; and control means for controlling power of the pump light output to the first multiplexing means and the second multiplexing means, based on wavelength information about at least one of the first wavelength division multiplexed optical signal and the second wavelength division multiplexed optical signal.

Supplementary Note 2

The repeater according to supplementary note 1, wherein the wavelength information includes at least one item of information about a number of wavelengths of the first wavelength division multiplexed optical signal, information about a wavelength band of the first wavelength division multiplexed optical signal, information about a number of wavelengths of the second wavelength division multiplexed optical signal, and information about a wavelength band of the second wavelength division multiplexed optical signal.

Supplementary Note 3

The repeater according to supplementary note 1 or 2, wherein the pump light supplying means includes a pump light source generating the pump light and distribution means for distributing an output of the pump light source to the first multiplexing means and the second multiplexing means.

Supplementary Note 4

The repeater according to supplementary note 3, wherein the distribution means is a coupler with a variable branching ratio, and the control means controls a branching ratio of the coupler, based on the wavelength information.

Supplementary Note 5

The repeater according to supplementary note 3, wherein the distribution means includes:

a first coupler coupling an output of the pump light source and outputting the coupled light from a plurality of ports;

a second coupler coupling input light and outputting the coupled light to the first multiplexing means;

a third coupler coupling input light and outputting the coupled light to the second multiplexing means; and a switch capable of outputting the pump light output from the first coupler to the second coupler or the third coupler.

Supplementary Note 6

The repeater according to supplementary note 5, further comprising a variable optical attenuator at at least one location out of an output of the first coupler, an output of the second coupler, and an output of the third coupler, wherein the control means controls attenuation of the variable optical attenuator, based on the wavelength information.

Supplementary Note 7

The repeater according to supplementary note 3, wherein the distribution means includes:

a first coupler coupling outputs of the pump light source and outputting the coupled light from a plurality of ports;

a second coupler coupling input light and outputting the coupled light to the first multiplexing means and the second multiplexing means;

a third coupler coupling input light and outputting the coupled light; and a switch capable of outputting the pump light output from the first coupler to the second coupler or the third coupler.

Supplementary Note 8

The repeater according to supplementary note 3, wherein the pump light source generates beams of the pump light with wavelengths different from one another, and the distribution means includes:

third multiplexing means for wavelength-multiplexing input light and outputting the multiplexed light to the first multiplexing means;

fourth multiplexing means for wavelength-multiplexing input light and outputting the multiplexed light to the second multiplexing means; and a switch capable of outputting the pump light input from the pump light source to the second multiplexing means or the third multiplexing means.

Supplementary Note 9

The repeater according to any one of supplementary notes 1 to 8, further comprising:

branching means for splitting at least one of the first wavelength division multiplexed optical signal and the second wavelength division multiplexed optical signal; and monitoring means for extracting the wavelength information of an optical signal split by the branching means and outputting the extracted wavelength information to the control means.

Supplementary Note 10

The repeater according to any one of supplementary notes 1 to 8, further comprising:

branching means for splitting at least one of the first wavelength division multiplexed optical signal and the second wavelength division multiplexed optical signal; and control signal extraction means for extracting, from an optical signal split by the branching means, a control signal instructing, to the pump light supplying means, power of the pump light output to the first multiplexing means and the second multiplexing means, and outputting the extracted control signal to the control means.

Supplementary Note 11

A communication system comprising:

a first land terminal device outputting the first wavelength division multiplexed optical signal;

a second land terminal device outputting the second wavelength division multiplexed optical signal; and the repeater according to any one of supplementary notes 1 to 10.

Supplementary Note 12

A repeating method comprising:
generating pump light;
multiplexing the pump light and a first wavelength division multiplexed optical signal;
multiplexing the pump light and a second wavelength division multiplexed optical signal;
amplifying the first wavelength division multiplexed optical signal by use of the pump light;
amplifying the second wavelength division multiplexed optical signal by use of the pump light;
acquiring wavelength information of at least one of the first wavelength division multiplexed optical signal and the second wavelength division multiplexed optical signal; and
controlling power of the pump light, based on the wavelength information.

Supplementary Note 13

A recording medium storing a program for a repeater recorded thereon, the program causing a computer in the repeater to execute:
a procedure of acquiring wavelength information of at least one of a first wavelength division multiplexed optical signal and a second wavelength division multiplexed optical signal; and
a procedure of controlling power of the first wavelength division multiplexed optical signal and the second wavelength division multiplexed optical signal, based on the wavelength information.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims priority from Japanese Patent Application No. 2017-077321 filed on Apr. 10, 2017, the disclosure of which is incorporated herein in its entirety by reference.

REFERENCE SIGNS LIST 10, 20, 900 Submarine optical communication system
100 to 400, 903 Repeater
101, 102, 901, 902 Land terminal device
110 Control unit
120 to 126 Pump light supplying unit
131, 132, 907 Multiplexing unit
141 Amplification unit
221 to 22N, 271 to 274, 905 Pump LD
231 Distribution unit
232 Variable branching coupler
240 to 242, 261 to 264 Coupler
250 to 252 Switch
281, 282 Multiplexer
310 Branching unit
320 Monitoring unit
330 Control signal extraction unit
904 Optical amplifier

What is claimed is:
1. A repeater comprising:
a pump light supplier configured to generate pump light;
a first multiplexer configured to multiplex the pump light and a first wavelength division multiplexed optical signal;
a second multiplexer configured to multiplex the pump light and a second wavelength division multiplexed optical signal;
a first amplifier configured to amplify the first wavelength division multiplexed optical signal by use of the pump light;
a second amplifier configured to amplify the second wavelength division multiplexed optical signal by use of the pump light; and
a controller configured to control power of the pump light output to the first multiplexer and the second multiplexer, based on wavelength information about at least one of the first wavelength division multiplexed optical signal and the second wavelength division multiplexed optical signal,
wherein the wavelength information includes at least one item of information about a wavelength band of the first wavelength division multiplexed optical signal, and information about a wavelength band of the second wavelength division multiplexed optical signal.

2. The repeater according to claim 1, wherein the pump light supplier includes a pump light source generating the pump light and a distributor configured to distribute an output of the pump light source to the first multiplexer and the second multiplexer.

3. The repeater according to claim 2, wherein the distributor is a coupler with a variable branching ratio, and
wherein the controller controls a branching ratio of the coupler, based on the wavelength information.

4. The repeater according to claim 2, wherein the distributor includes:
a first coupler coupling outputs of the pump light source and outputting the coupled light from a plurality of ports;
a second coupler coupling input light from plural inputs and outputting the coupled light to the first multiplexer;
a third coupler coupling input light from plural inputs and outputting the coupled light to the second multiplexer; and
a switch capable of outputting the pump light output from the first coupler to the second coupler or the third coupler.

5. The repeater according to claim 4, further comprising:
a variable optical attenuator at least one location out of an output of the first coupler, an output of the second coupler, and an output of the third coupler,
wherein the controller controls attenuation of the variable optical attenuator, based on the wavelength information.

6. The repeater according to claim 2, wherein the distributor includes:
a first coupler coupling outputs of the pump light source and outputting the coupled light from a plurality of ports;
a second coupler coupling input light from plural inputs and outputting the coupled light to the first multiplexer and the second multiplexer;
a third coupler coupling input light from plural inputs and outputting the coupled light; and a switch capable of outputting the pump light output from the first coupler to the second coupler or the third coupler.

7. The repeater according to claim 2, wherein the pump light source generates beams of the pump light with wavelengths different from one another, and the distributor includes:
a third multiplexer configured to wavelength-multiplex input light and output the multiplexed light to the first multiplexer;
a fourth multiplexer configured to wavelength-multiplex input light and output the multiplexed light to the second multiplexer; and
a switch capable of outputting the pump light input from the pump light source to the third multiplexer or the fourth multiplexer.

8. The repeater according to claim 1, further comprising:
a splitter configured to split at least one of the first wavelength division multiplexed optical signal and the second wavelength division multiplexed optical signal; and
a monitor configured to extract the wavelength information of an optical signal split by the splitter and output the extracted wavelength information to the controller.

9. The repeater according to claim 1, further comprising:
a splitter configured to split at least one of the first wavelength division multiplexed optical signal and the second wavelength division multiplexed optical signal; and
a control signal extractor configured to extract, from an optical signal split by the splitter, a control signal instructing, to the pump light supplier, power of the pump light output to the first multiplexer and the second multiplexer, and output the extracted control signal to the controller.

10. A communication system comprising:
a first land terminal device outputting the first wavelength division multiplexed optical signal;
a second land terminal device outputting the second wavelength division multiplexed optical signal; and
the repeater according to claim 1.

11. A repeating method comprising:
generating pump light;
multiplexing the pump light and a first wavelength division multiplexed optical signal;
multiplexing the pump light and a second wavelength division multiplexed optical signal;
amplifying the first wavelength division multiplexed optical signal by use of the pump light;
amplifying the second wavelength division multiplexed optical signal by use of the pump light;
acquiring wavelength information of at least one of the first wavelength division multiplexed optical signal and the second wavelength division multiplexed optical signal; and
controlling power of the pump light, based on the wavelength information,
wherein the wavelength information includes at least one item of information about a wavelength band of the first wavelength division multiplexed optical signal, and information about a wavelength band of the second wavelength division multiplexed optical signal.

12. A tangible and non-transitory recording medium storing a program for a repeater recorded thereon, the program, if executed, causing a computer in the repeater to execute:
a procedure of acquiring wavelength information of at least one of a first wavelength division multiplexed optical signal and a second wavelength division multiplexed optical signal; and
a procedure of controlling power of the first wavelength division multiplexed optical signal and the second wavelength division multiplexed optical signal, based on the wavelength information,
wherein the wavelength information includes at least one item of information about a wavelength band of the first wavelength division multiplexed optical signal, and information about a wavelength band of the second wavelength division multiplexed optical signal.

13. The repeater according to claim 1, wherein the pump light supplier includes a pump light source generating the pump light and a distributor configured to distribute an output of the pump light source to the first multiplexer and the second multiplexer.

14. The repeater according to claim 13, wherein the distributor is a coupler with a variable branching ratio, and
wherein the controller controls a branching ratio of the coupler, based on the wavelength information.

15. The repeater according to claim 13, wherein the distributor includes:
a first coupler coupling outputs of the pump light source and outputting the coupled light from a plurality of ports;
a second coupler coupling input light from plural inputs and outputting the coupled light to the first multiplexer;
a third coupler coupling input light from plural inputs and outputting the coupled light to the second multiplexer; and
a switch capable of outputting the pump light output from the first coupler to the second coupler or the third coupler.

16. The repeater according to claim 13, wherein the distributor includes:
a first coupler coupling outputs of the pump light source and outputting the coupled light from a plurality of ports;
a second coupler coupling input light from plural inputs and outputting the coupled light to the first multiplexer and the second multiplexer;
a third coupler coupling input light from plural inputs and outputting the coupled light; and
a switch capable of outputting the pump light output from the first coupler to the second coupler or the third coupler.

17. The repeater according to claim 13, wherein the pump light source generates beams of the pump light with wavelengths different from one another, and the distributor includes:
a third multiplexer configured to wavelength-multiplex input light and output the multiplexed light to the first multiplexer;
a fourth multiplexer configured to wavelength-multiplex input light and output the multiplexed light to the second multiplexer; and
a switch capable of outputting the pump light input from the pump light source to the second multiplexer or the third multiplexer.

* * * * *